United States Patent [19]
Small

[11] 3,816,907
[45] June 18, 1974

[54] METHOD OF MANUFACTURING ARMATURES FOR ELECTROMECHANICAL ENERGY CONVERTERS

[75] Inventor: Robert A. Small, Webster Park, Ill.

[73] Assignee: Electronic Memories & Magnetics Corporation, Los Angeles, Calif.

[22] Filed: Nov. 16, 1972

[21] Appl. No.: 307,071

Related U.S. Application Data
[62] Division of Ser. No. 140,473, May 5, 1971, abandoned.

[52] U.S. Cl................. 29/598, 29/625, 310/42, 310/266
[51] Int. Cl. .......................................... H02k 15/02
[58] Field of Search ...... 29/596, 598, 625; 310/266, 310/42, 268, 265

[56] References Cited
UNITED STATES PATENTS

| | | | |
|---|---|---|---|
| 3,312,846 | 4/1967 | Henry-Baudot | 310/266 |
| 3,382,570 | 5/1968 | Knapp et al. | 29/598 |
| 3,619,899 | 11/1971 | Takeda et al. | 29/598 |
| 3,623,220 | 11/1971 | Chase et al. | 29/598 |
| 3,650,021 | 3/1972 | Karol | 29/598 |
| 3,668,452 | 6/1972 | Hu | 310/266 |
| 3,698,079 | 10/1972 | Lifschitz | 29/598 |

*Primary Examiner*—Charles W. Lanham
*Assistant Examiner*—Carl E. Hall
*Attorney, Agent, or Firm*—Lindenberg, Freilich & Wasserman

[57] ABSTRACT

Armatures of a printed-circuit form are produced on a woven glass fiber tube formed on a mandrel, plating a layer of conductive material on the tube, etching a plurality of grooves to form a first pattern of conductors, repeating the first four steps with a shorter tube of woven glass fiber to provide a second pattern of conductors insulated from the first, but connected thereto through rings of conductive material formed at each end by plating directly over end rings of the first pattern, and cutting axial slots in the end rings to a depth sufficient to disconnect adjacent parallel conductors of each pattern leaving juxtaposed ends of conductors at the ends. For a rigid armature, the layers of woven glass fiber are impregnated with a resin which is rigid when cured and for a flexible armature, with a resin which is flexible when cured.

6 Claims, 7 Drawing Figures

INVENTOR
ROBERT A. SMALL
BY
Lindenberg, Freilich & Wasserman
ATTORNEYS

INVENTOR
ROBERT A. SMALL

METHOD OF MANUFACTURING ARMATURES FOR ELECTROMECHANICAL ENERGY CONVERTERS

This application is a division of application Ser. No. 140,473, filed May 5, 1971 now abandoned.

BACKGROUND OF THE INVENTION

This invention relates to armatures for electromechanical energy converters and more particularly to a method of making such armatures.

The demand for electromechanical energy converters having higher response characteristics has increased with the demand for higher speed machines. Process machines, machine tools, and magnetic tape handlers are among the most significant markets which require fast response converters such as motors with high torque and low inertia.

The conventionally designed converters employ armatures having a large rotating mass consisting of ferrous laminations to conduct the magnetic flux, wound wire to conduct the currents, a commutator to properly assign current direction to the winding, and a shaft which couples the armature to an external mechanism. All of this rotating mass (armature and core) yields a high moment of inertia. This rotating mass needs to be reduced without sacrifice in torque produced or current generated in order to improve response characteristics.

In a motor, the response characteristic desired is the ability to accelerate and/or decelerate quickly upon command. Newton's second law of motion defines angular acceleration as the ratio of torque (T) to moment of inertia (J). Expressed algebraically:

$\alpha(rad/sec/sec) = T(in\ oz)/\ J(in\ oz\ sec^2)$

To increase angular acceleration, torque can be increased or inertia can be decreased, or both. The latter obviously permits optimizing torque. Therefore it would be desirable to maintain a high torque level and reduce the inertia to about three one-hundredths or less of the inertia of a conventional motor with the same damping constant. It would be similarly desirable to reduce the inertia of armatures for other types of devices such as tachometers, resolvers and the like, including linear devices and motors.

Many arrangements have been employed to reduce the inertia of armatures. The most common is a multilayer printed-circuit arrangement with one set of substantially parallel conductors separated from another by a sheet of insulating material. At each end of the sheet, the conductors on one side are connected to conductors on the other side by plating through holes, plating around the edge or soldering the ends of conductors together. Such techniques of interconnecting conductors to form a desired continuous winding is unsuitable for reliable production in large quantities due to problems in plating through holes or around the ends and of making reliable solder connections.

As an alternative technique to plating, more reliable interconnections may be made by riveting through holes. However, although the resulting interconnections are more reliable, the cost in labor or machinery would be greater than for the other techniques. In any case, the rivets will protrude above the surface of the finished armature. Such protrusions would not be desirable, and in some applications would be intolerable.

OBJECTS AND SUMMARY OF THE INVENTION

An object of this invention is to provide an improved method for producing armatures using printed circuit techniques.

Still another object is to provide a method a cylindrical armature on a mandrel.

These and other objects of the invention are achieved in an armature produced by preparing a mandrel with a mold release, forming a first layer of insulation material over the mold release, machining the insulating material to a desired thickness, plating a first layer of conductive material on the first insulating layer, machining the first conductive layer to a desired thickness, etching a plurality of parallel grooves through the conductive layer to provide a first pattern of parallel conductors with ends near opposite sides of said first insulating layer connected by bars or rings of conductive material, repeating the first four steps with a shorter layer of insulating material to provide a second pattern of conductors insulated from the first, but having ends connected to the bars or rings of the first layer of conductive material at both ends, removing the resulting multilayer structure from the mandrel, cutting both ends of the resulting multilayer structure, but leaving a narrow ring at each end connecting the two patterns of conductors, and cutting axial slots in the end bars or rings to a depth sufficient to disconnect adjacent parallel conductors of each pattern, but leaving juxtaposed ends of conductors of the two conductor patterns connected at the ends of the resulting multilayer structure.

The novel features of the invention are set forth with particularity in the appended claims. The invention will best be understood from the following description when read in conjunction with the accompanying drawings.

DESCRIPTION OF THE PREFERRED EMBODIMENT

Once the design of a printed-circuit pattern has been produced for an armature having desired operating characteristics, suitable masks in the form of film negative overlays are produced. For a cylindrical armature, this may be done by preparing the conductor patterns on flat planes in order to use conventional techniques for producing the required film negative overlays. These overlays may then be wrapped around the respective cylindrical layers of conductive material on which the two patterns of conductors are to be etched. The etching process uses a conventional photo resist.

Thus, once a conductor configuration has been defined, the novel fabricating method to be described with reference to the drawings is used to advantage in producing a hollow cylindrical armature of higher uniform quality than has heretofore been possible using conventional printed circuit fabricating techniques.

Figure 1:
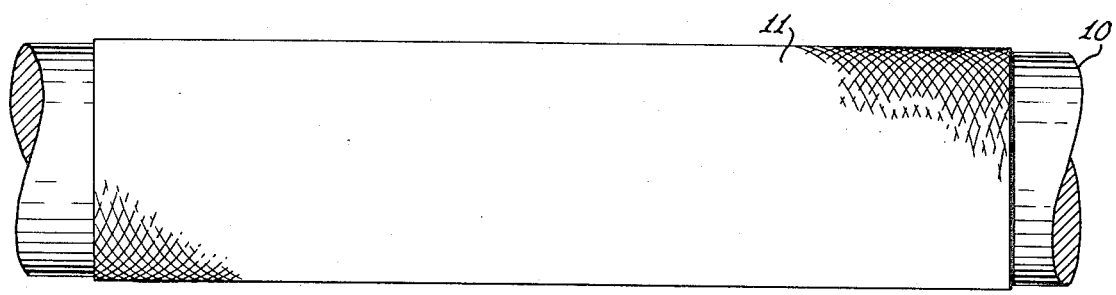
FIGS. 1 through 6 illustrate the production of a hollow cylindrical armature in accordance with the present invention at various successive steps, the last step being illustrated in FIG. 6 in a fragmentary perspective view to facilitate understanding the manner in which two patterns of electrically insulated and substantially parallel conductors are interconnected to form a continuous winding.

In the first step, a stainless steel mandrel 10 is made to the desired internal diameter of the armature to be produced. A suitable mold release is applied to the surface of the mandrel, such as a film-forming material (methyl cellulose or cellulose acetate) or lubricant (petroleum jelly) commonly used in the plastics technology to allow a plastic part to be removed from the mold. Then a fiber glass sheet or sleeve 11 (hereinafter referred to simply as a sheet, but intended to include a tubular sheet in the form of a sleeve) shown in FIG. 1 is tightly wrapped or pulled over the mandrel 10 and impregnated to saturation with a resin which is rigid when cured, such as a thermosetting epoxy. The resin is cured while the sheet 11 is held tightly to the mandrel, as by a rubber band or a string around each end. The result is a rigid tube of electrical insulating material formed on the mandrel 10. This tube is then machined to a desired diameter for the first layer of insulating material.

Figure 2:
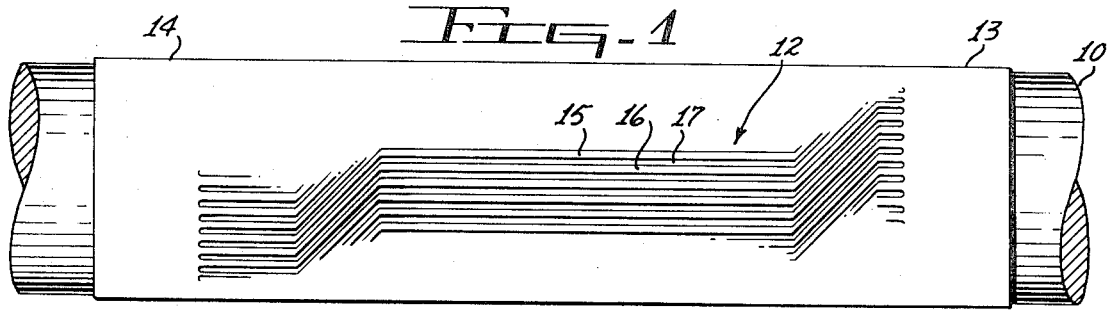

In the next step, not illustrated in the drawings, copper is plated over the tube to a thickness and length exceeding the requirements for a first pattern of substantially parallel conductors 12 interconnected at each end by solid annular bars or rings 13 and 14 as shown in FIG. 2. Before the first pattern of substantially parallel conductors is formed, this first layer of copper is machined to a desired diameter for the required thickness of the conductors. The conductor pattern is then etched in this layer of copper using standard printed-circuit techniques.

The etching procedure is to first coat the machined layer of copper with a photoresist, then expose the photoresist coating with a light through a film negative overlay of the desired pattern tightly wrapped around the layer of copper. A resist wash removes all unexposed photoresist, leaving a pattern of exposed photoresist material on the layer of copper in the exact pattern of the desired conductors, such as conductors 15 and 16. The groove 17 between the conductors is thus free of photoresist after the wash so that exposed copper can be removed with a suitable etchant.

It should be noted that the pattern is uniform around the entire circumference of the tubular layer 13 of copper. Only part of the pattern is shown to simplify the drawings.

Figure 3:
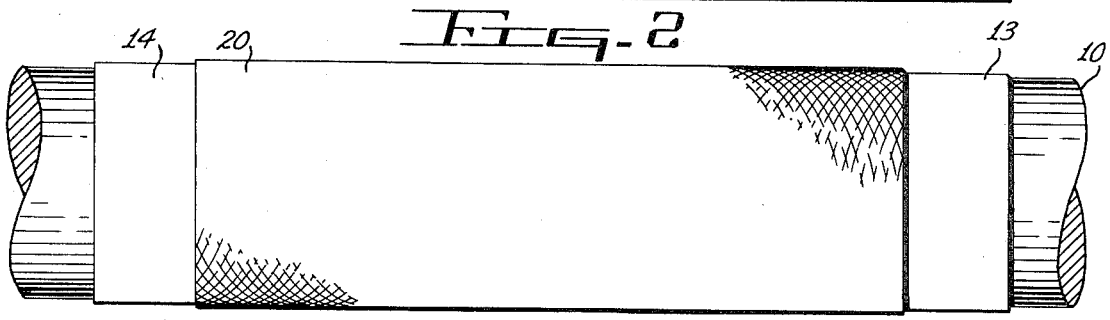

Once the first pattern of conductors has been provided, the exposed photoresist used as an etching mask is removed. In the next step illustrated in FIG. 3, a second layer 20 of epoxy impregnated fiber glass is formed to provide a tube over the first pattern of conductors in the same manner as the first tube was formed. This second tube is then machined to a desired diameter, and to a desired length substantially equal to the axial length of the grooves etched in the first layer of copper, such as the groove 17 between conductors 16 and 17. A second layer of copper is plated over the second tube 20 and the conductive end rings 13 and 14 of the first conductive pattern. As in the case of the first layer of copper, the second layer is plated to a thickness exceeding the requirements for the second conductive pattern. This second layer of copper is then machined to the diameter required for the desired thickness of the conductors in the second pattern 22 shown in FIG. 4.

The second pattern of conductors, like the first, is not shown in complete detail to simplify the drawings. It is produced in the second layer of copper using the same techniques as for the first pattern 12. In order that the ends of the conductors in the second pattern be formed directly over conductors in the first pattern, indexing marks, grooves, or notches, provided on the edges of the film negative overlays for the two conductive patterns are used to line up the overlays for the desired orientation of the conductors relative to each other and to a scribe on the mandrel 10.

Figure 4:
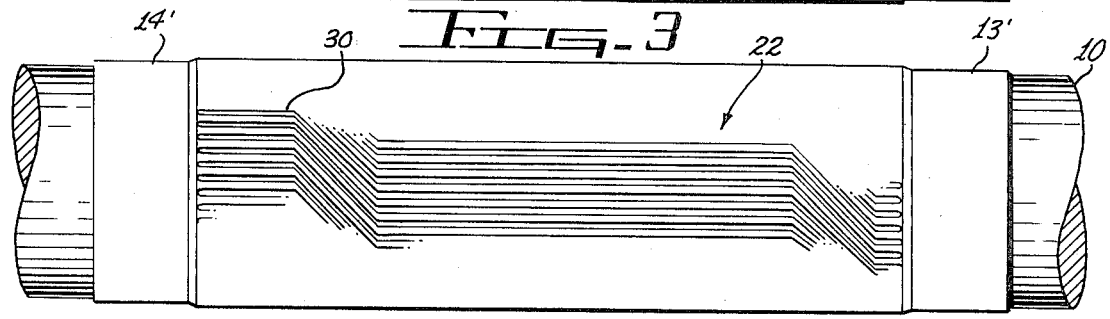

It should be noted that all of the conductors of the two patterns are electrically connected by the continuous copper layer plated over the second tube 20 and onto the end rings 13 and 14, thus producing slightly thicker end rings 13' and 14' shown in FIG. 4. It is also important to note that the length of the second tube 20 is machined down on the ends to the surface of the first layer of copper, thus fully exposing the end rings 13 and 14 to within, for example, approximately one-sixteenth of an inch of what will ultimately be the ends of the conductors. Thus the second layer of copper is plated over the second tube 20 and directly on the end rings 13 and 14 of the first layer of copper almost to the ends of the grooves in the first pattern of conductors.

Figure 5:
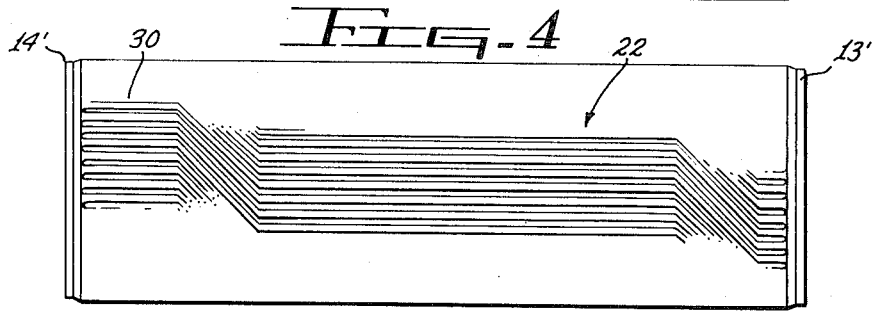

After etching the second pattern of conductors shown in FIG. 4, annular bars or rings 13' and 14' are left on the ends of the tubular structure. The continuous winding is then finally formed from the two patterns of conductors by machining the end rings 13' and 14' to a desired length, for example to within nine one-hundredths of an inch of the ends of the etched grooves in the two patterns of conductors. The resulting structure is shown in FIG. 5 after it has been removed from the mandrel 10 with the narrow conductive rings 13' and 14'.

Figure 6:
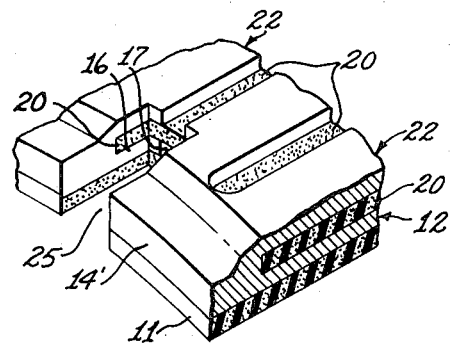
Figure 7:
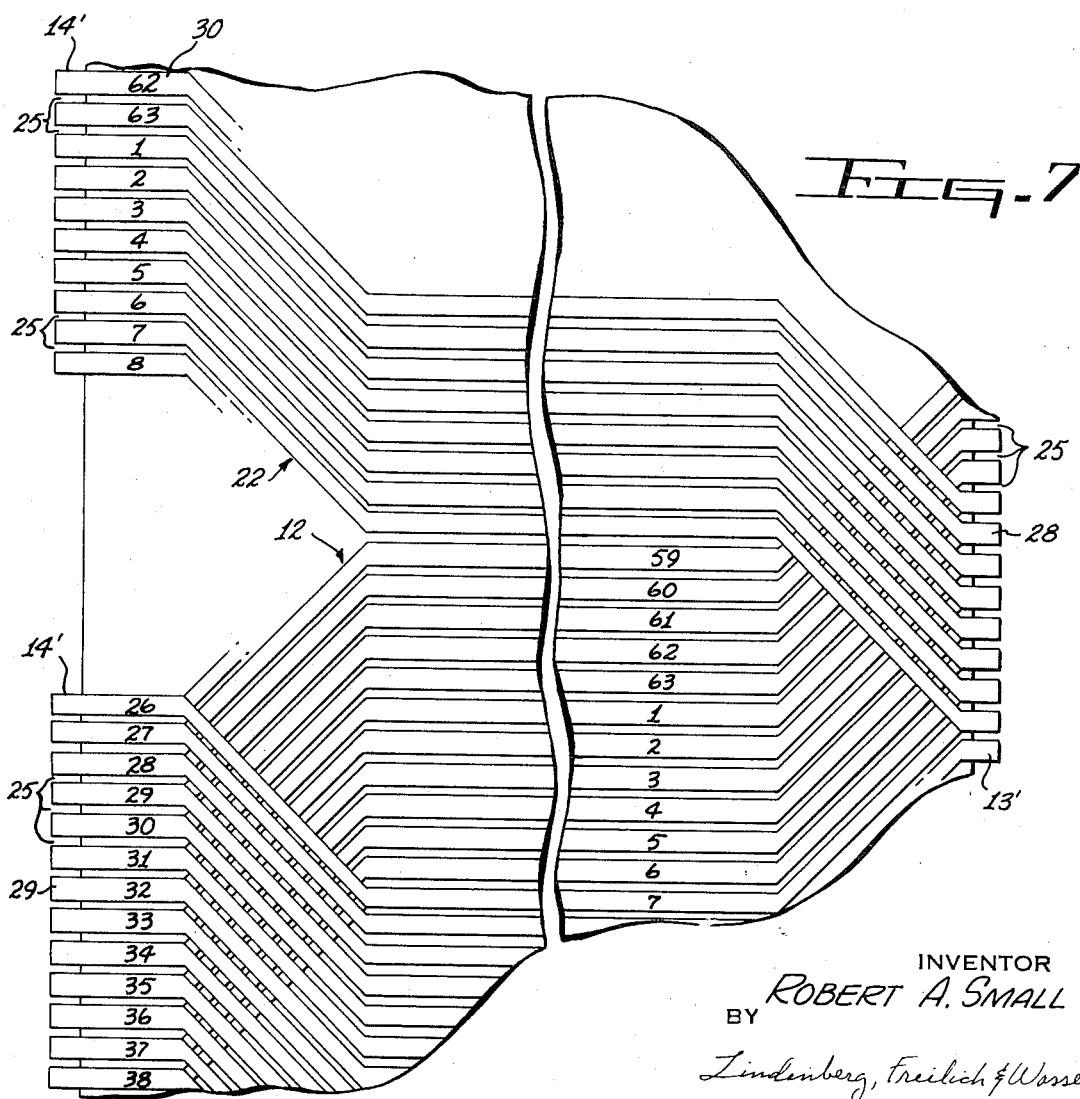
FIG. 7 is a flat section of the resulting structure which shows the sequence in which the successive conductors of one pattern are connected to the successive conductors of the other pattern. It also serves to illustrate a portion of a flat rectangular armature produced by the same steps illustrated in FIGS. 1 to 6 but using a flat plate instead of a mandrel.

Adjacent conductors of the second pattern 22 are disconnected from each other at both ends by cutting longitudinal slots through ends of both narrow end rings 13' and 14' to a depth substantially into the etched grooves in the pattern 22, as shown for a slot 25 in Fig. 6, thereby simultaneously separating conductors of the first or inner pattern, but leaving the registered ends of the inner pattern connected to the registered ends of the outer pattern through the remaining segments of the narrow end rings 13' and 14', as may be more clearly seen in FIG. 7.

FIG. 7 shows a flattened fragment structure of FIG. 6 after it has been slotted as described with reference to FIG. 6, but as in the FIGS. 2, 4 and 5, many of the inner and outer pattern conductors are not shown to simplify the drawings. Each of the inner and outer pattern conductors are not shown to simplify the drawings. Each of the inner and outer patterns in this illustrative example consist of 63 substantially parallel conductors.

To better understand the sequence in which the conductors of the second (outer) pattern are connected to conductors of the first (inner) pattern, the conductors of the first pattern are numbered sequentially from one to 63 in a commutator zone 30 while the conductors of the first pattern are numbered from one to 63 on their longitudinal control sections. Thus it may be seen that conductor No. 1 of the second (outer) layer is connected to conductor No. 1 of the first inner layer at a segment 28 of the slotted end ring 13' while the conductor No. 1 of the first (inner) pattern is connected to conductor No. 32 by a segment 29 of the slotted end ring 14'. This connection sequence is continued until all 63 conductors of the second pattern are connected to all 63 conductors of the first pattern at both ends. The entire assembly thus produced in the manner described is covered with a thin protective film, such as of lacquer, except over the commutator area 30.

It should be noted that upon completion of four axial excursions of the resulting winding, the inside-to-outside pattern connections have dropped back one conductor, e.g. conductor No. 32 of the inner pattern is connected to conductor No. 63 of the outer pattern.

The annular commutator section of the armature thus far described is then ready to be attached to a shaft by a disc at one or both ends. In either case, the disc is preferably of insulating material although that is not necessary since the inner pattern of connectors is supported on the tube 11 of insulating material. When a disc is used on only one end, a stationary ferrous core may be inserted through the open end in a known manner. When the cylindrical armature is connected to a disc at both ends, and a shaft is passed through and secured to both discs, a ferrous core may be suspended on the shaft within the armature using ball bearings so that the armature may rotate free of the core, also in a known manner.

The present invention has been described with reference to a cylindrical form of rigid or flexible insulating material. However, it should be understood that the present invention may apply to a linear form, particularly of rigid insulating material, for use in such devices as linear motors. It should also be understood that the pattern of conductors used may be adapted for the needs of the particular device employing an armature provided in accordance with the present invention, and that on a given armature, additional layers of insulating material and conductive patterns may be provided without departing from the true scope of the present invention. Accordingly, it is intended that the scope of the following claims be interrupted to cover such other forms and arrangements of conductive patterns.

What is claimed is:

1. A method of producing an armature for an electromechanical energy converter comprising the steps of
    forming a first layer of insulating material on a cylindrical mandrel,
    plating a first cylindrical layer of conductive material on said first layer of insulating material,
    etching a first set of grooves to form a first conductive pattern on said first layer of conductive material, said pattern consisting of substantially parallel conductors, each conductor having its ends connected to end ring sections of conductive material formed from unetched portions of said first layer of conductive material,
    forming a second cylindrical layer of insulating material over said first pattern of conductors, said second layer of insulating material extending to approximately the ends of said grooves etched in said first layer of conductive material to form said conductors of said first pattern,
    plating a second cylindrical layer of conductive material over said second layer of insulating material and onto said end ring sections at both ends of said grooves forming conductors of said first pattern,
    etching a second set of grooves to form a second conductive pattern in said second layer of conductive material, said pattern consisting of substantially parallel conductors with both ends of each etched groove between a pair of conductors directly over ends of etched grooves between adjacent conductors of said first conductive pattern,
    producing slots in each end section from its outer edge into etched grooves between conductors of said first and second conductive patterns sometimes after etching said second set of grooves, thereby separating conductors of said first conductive pattern at each end, separating conductors of said second conductive pattern at each end, and leaving ends of a given conductor of said second conductive pattern connected to ends of conductors of said first pattern, and
    removing the structure formed from the mandrel sometime after etching said second set of grooves.

2. A method as defined in claim 1 wherein said first and second layers of insulating material are formed using material which is flexible when set, and conductive material is not plated thereon until set.

3. A method as defined in claim 1 wherein said first and second layers of insulating material are formed using material which becomes rigid when set, and conductive material is not plated thereon until set.

4. A method of producing a hollow cylindrical armature comprising the steps of
    preparing a rigid mandrel with a film of a mold release agent on the entire cylindrical surface to be used for fabrication of said armature,
    forming over said film of mold release agent on said mandrel a first tubular layer of insulating material,
    forming a first tubular layer of conductive material over said first layer of insulating material,
    etching a first conductive pattern on said first tubular layer of conductive material, said first pattern consisting of etched grooves between substantially parallel conductors, each conductor having its ends connected to end rings of conductive material in unetched portions of said first layer of conductive material,
    forming a second tubular layer of insulating material over said first conductive pattern, said second tubular layer of insulating material extending longitudinally to approximately the ends of said grooves etched for said first conductive pattern,
    forming a second cylindrical layer of conductive material over said second cylindrical layer of insulating material and onto both end rings of said first cylindrical layer of conductive material,
    etching a second conductive pattern on said second layer of conductive material, said second conductive pattern consisting of etched grooves between substantially parallel conductors with both ends of each etched groove directly over ends of etched grooves between conductors of said first conductive pattern, and
    producing axial slots in each end ring from its outer edge to etched grooves between conductors of said first and second conductive patterns, thereby separating conductors of said first pattern at each end, and leaving ends of each conductor of said second pattern connected to ends of conductors of said first pattern.

5. A method as defined in claim 4 wherein said layers of insulating material are formed using material which becomes rigid when set, and conductive material is not plated thereon until set.

6. A method as defined in claim 4 wherein said layers of insulating material are formed using material which is flexible when set, and conductive material is not plated thereon until set.

* * * * *